(12) United States Patent
Struik

(10) Patent No.: US 8,572,367 B2
(45) Date of Patent: Oct. 29, 2013

(54) SYSTEM AND METHOD FOR REDUCING COMPUTATIONS IN AN IMPLICIT CERTIFICATE SCHEME

(75) Inventor: Marinus Struik, Toronto (CA)

(73) Assignee: Certicom Corp., Mississauga (CA)

( * ) Notice: Subject to any disclaimer, the term of this patent is extended or adjusted under 35 U.S.C. 154(b) by 300 days.

(21) Appl. No.: 13/037,018

(22) Filed: Feb. 28, 2011

(65) Prior Publication Data

US 2012/0221850 A1  Aug. 30, 2012

(51) Int. Cl.
*H04L 29/06* (2006.01)
(52) U.S. Cl.
USPC ............. 713/156; 713/157; 713/158; 380/30; 380/282; 380/285
(58) Field of Classification Search
USPC .......................................................... 713/156
See application file for complete search history.

(56) References Cited

U.S. PATENT DOCUMENTS

| | | | |
|---|---|---|---|
| 7,249,259 B1 | 7/2007 | Vanstone et al. | |
| 7,391,868 B2 | 6/2008 | Qu et al. | |
| 2006/0168443 A1* | 7/2006 | Miller et al. | 713/156 |
| 2007/0064932 A1 | 3/2007 | Struik et al. | |
| 2007/0180230 A1* | 8/2007 | Cortez | 713/156 |
| 2010/0318804 A1* | 12/2010 | Volkovs | 713/176 |

FOREIGN PATENT DOCUMENTS

| | | | |
|---|---|---|---|
| EP | 1056053 A2 | 11/2000 | |
| WO | WO 2008/058377 A1 | 5/2008 | |

OTHER PUBLICATIONS

Rabadi, "Anonymous Group Implicit Certificate Scheme", 2010, IEEE, 2 pages.*
Struik et al, "SEC 4: Elliptic Curve Qu-Vanstone Implicit Certificate Scheme (ECQV), v0.91", Standards for Efficient Cryptography Group, Nov. 18, 2008.
"Information Technology—Open Systems Interconnection—The Directory: Public-key and attribute certificate frameworks; X.509 (Aug. 2005)", ITU-T Standard in Force (I), International Telecommunication Union, Aug. 29, 2005, p. 6, No. X.509 (Aug. 2005), Geneva, CH.
Huang et al, "Fast authenticated key establishment protocols for self-organizing sensor networks", Proceedings from the 2nd Association for Computing Machinery (ACM) International Workshop on Wireless Sensor Networks & Applications (WSNA), Jan. 1, 2003, ACM WSNA, New York.

(Continued)

*Primary Examiner* — David Pearson
*Assistant Examiner* — Thaddeus Plecha
(74) *Attorney, Agent, or Firm* — Wilfred P. So; John R. S. Orange; Blake, Cassels & Graydon LLP

(57) ABSTRACT

There are disclosed systems and methods for reducing the number of computations performed by a computing device constructing a public key from an implicit certificate associated with a certificate authority in an implicit certificate scheme. In one embodiment, the device first operates on the implicit certificate to derive an integer e. The device then derives a pair of integers ($e_1$, $e_2$) from the integer e, such that each of the pair of integers ($e_1$, $e_2$) has a bit length less than the bit length of the integer e, and such that the ratio of the pair of integers ($e_1$, $e_2$) corresponds to the integer e. The device then computes the public key by combining the integers $e_1$ and $e_2$ with public key contribution data derived from the implicit certificate and a public key of the certificate authority.

17 Claims, 10 Drawing Sheets

(56) References Cited

OTHER PUBLICATIONS

Park Y-H et al.: "An Alternate Decomposition of an Integer for Faster Point Multiplication on Certain Elliptic Curves", Public Key Cryptography—International Workshop on Practice and Theory in Public Key Cryptography, Jan. 1, 2002, pp. 323-324.

Antipa et al.: "Accelerated Verification of ECDSA Signatures," Lecture Notes in Computer Science, 2006, pp. 307-308, vol. 3897, Springer, Berlin.

Avanzi R.: "On Multi-Exponentiation in Cryptography," Cryptology ePrint Archive: Report 2002/154, Oct. 28, 2002.

Brown et al.: "Formal Security Proofs for a Signature Scheme with Partial Message Recovery", Lecture Notes in Computer Science, Feb. 24, 2000, Springer-Verlag.

"ECC and Digital Postage Marks—Part 2—Elliptic Curve Pintsov Vanstone Signatures", Code and Cipher Issues, 2004, vol. 1 No. 3: Using EC algorithms in real-world applications, Certicom Corp.

Billet, Olivier; European Search Report from corresponding EP Application No. 11156333.4; search completed Aug. 5, 2011.

* cited by examiner

SYSTEM AND METHOD FOR REDUCING COMPUTATIONS IN AN IMPLICIT CERTIFICATE SCHEME

TECHNICAL FIELD

The following relates generally to the generation of implicit certificates in cryptographic systems.

BACKGROUND

A cryptographic system is a computer system that uses cryptography, typically to secure or authenticate data communication between a pair of computing devices connected to one another through a data communication link in the system. Each computing device has a cryptographic unit with the processing capacity to implement one or more cryptographic protocols used to secure or authenticate the data communication. The cryptographic protocols typically perform arithmetic operations on the bit strings representing parameters, messages, or data in the protocols to produce a bit string representing the output from the protocol.

In cryptographic systems, Certification Authorities (CAs) are trusted $3^{rd}$ parties responsible for vouching for the authenticity of public keys. For example, if correspondent A wishes to distribute its public key $W_A$, correspondent A may request that a CA issue a certificate for public key $W_A$.

Depending upon the application, the CA may issue an implicit certificate for public key $W_A$. Implicit certificates are known in the art. Unlike conventional "explicit" certificates, implicit certificates require no explicit verification of the CA's signature. Therefore, implicit certificates are generally smaller in size and can offer bandwidth savings over conventional explicit certificates. A public key distributed via such an implicit certificate is implicitly authenticated by successfully using the public key in an operation that requires the use of the corresponding private key.

A well-known implicit certificate scheme is Elliptic Curve Qu-Vanstone (ECQV). This scheme provides implicit authentication when the implicit certificate is used in conjunction with an operation requiring the sender to use the corresponding private key, such, as in ECDH, ECMQV, or ECDSA operations. A summary of ECQV is as follows.

A correspondent, A, wishing to establish a private/public key pair ($w_A$, $W_A$) and distribute public key $W_A$ via an implicit certificate, first uses its random number generator to generate a random integer to be used as an ephemeral private key $d_A$. The cryptographic unit then generates a corresponding ephemeral public key $Q_A = d_A G$, where G is the base point on the underlying elliptic curve and a generator of the subgroup of the elliptic curve group. Correspondent A then sends $Q_A$, as well as any identity information, to the CA. The CA receives $Q_A$ and the identity information and performs the following steps:

1. Verify the received ephemeral public key $Q_A$ and identity information. Verification can be done a number of ways. For example, the CA may verify that $Q_A$ is a proper public key that satisfies specific criteria, such as being a point on the underlying, elliptic curve, and/or satisfies defined statistical criteria. In another example, the CA verifies whether the identity information is correct. If verification fails, abort operation. If verification succeeds, proceed.
2. Generate an ephemeral private and public key pair ($d_{CA}$, $Q_{CA}$), where $Q_{CA} = d_{CA} G$.
3. Compute public key contribution data $B_A = Q_A + Q_{CA}$.
4. Construct certificate data $I_A$.
5. Construct an implicit certificate $IC_A$ containing $B_A$ and $I_A$.
6. Compute e=Hash($IC_A$).
7. Compute private key contribution data $s = e d_{CA} + w_{CA}$ (mod n), where n is the order of base point. G, and $w_{CA}$ is the static private key of the CA.
8. Send $IC_A$ and s to correspondent A.

Upon receiving $IC_A$ and s, correspondent A performs the following steps to calculate its key pair ($w_A$, $W_A$):

1. Operate on $IC_A$ to obtain $B_A$ and $I_A$.
2. Verify the contents of $IC_A$ according to the application rules. For example, this may include verifying the information is properly formatted, verifying content of $I_A$ matches information sent by correspondent A to the CA, and/or verifying $B_A$ is a valid point on the underlying curve.
3. Compute e=Hash($IC_A$) and verify e≠0.
4. Compute its private key $w_A = e d_A + s$ (mod n).
5. Compute its public key $W_A = e B_A + W_{CA}$, where $W_{CA}$ is the static public key of the CA corresponding to the static private key $w_{CA}$.

The CA distributes the implicit certificate $IC_A$ to the other correspondents. A particular correspondent, say correspondent B, receives $IC_A$ and derives the public key $W_A$ of correspondent A as follows:

1. Operate on $IC_A$ to compute $B_A$ and $I_A$;
2. Verify the contents of $IC_A$ according to the application rules;
3. Compute e=Hash($IC_A$) and verify e≠0; and
4. Compute public key $W_A = e B_A + W_{CA}$.

Correspondent B is therefore able to use the static public key $W_{CA}$ of the CA to derive $W_A$ from the implicit certificate $IC_A$. However, correspondent B has no way of knowing whether correspondent A possesses the corresponding private key $w_A$. This is also the case with ordinary explicit certificates (e.g. ECDSA and RSA certificates), unless the CA first wants proof of possession before issuing a certificate. Therefore, authentication of correspondent A and its public key $W_A$ is not complete until an operation involving both $W_A$ and $w_A$ is successfully performed. For example, correspondent A and correspondent B may subsequently engage in an ECMQV key agreement or ECDSA signature protocol, both of which require the use of $W_A$ and $w_A$. If the key agreement or signature operations fail, then $W_A$ might not have been authentic or valid. On the other hand, if the key agreement or signature operations are successful; then correspondent A must possess $w_A$, and the authenticity and validity of $W_A$ is implicitly verified.

The ECQV implicit certificate scheme above is an example of an implicit certificate scheme. It is generally desired to reduce the number of computations performed in an implicit certificate scheme.

BRIEF DESCRIPTION

Representative embodiments will now be described by way of example only with reference to the accompanying drawings, in which.

DETAILED DESCRIPTION

Figure 1:
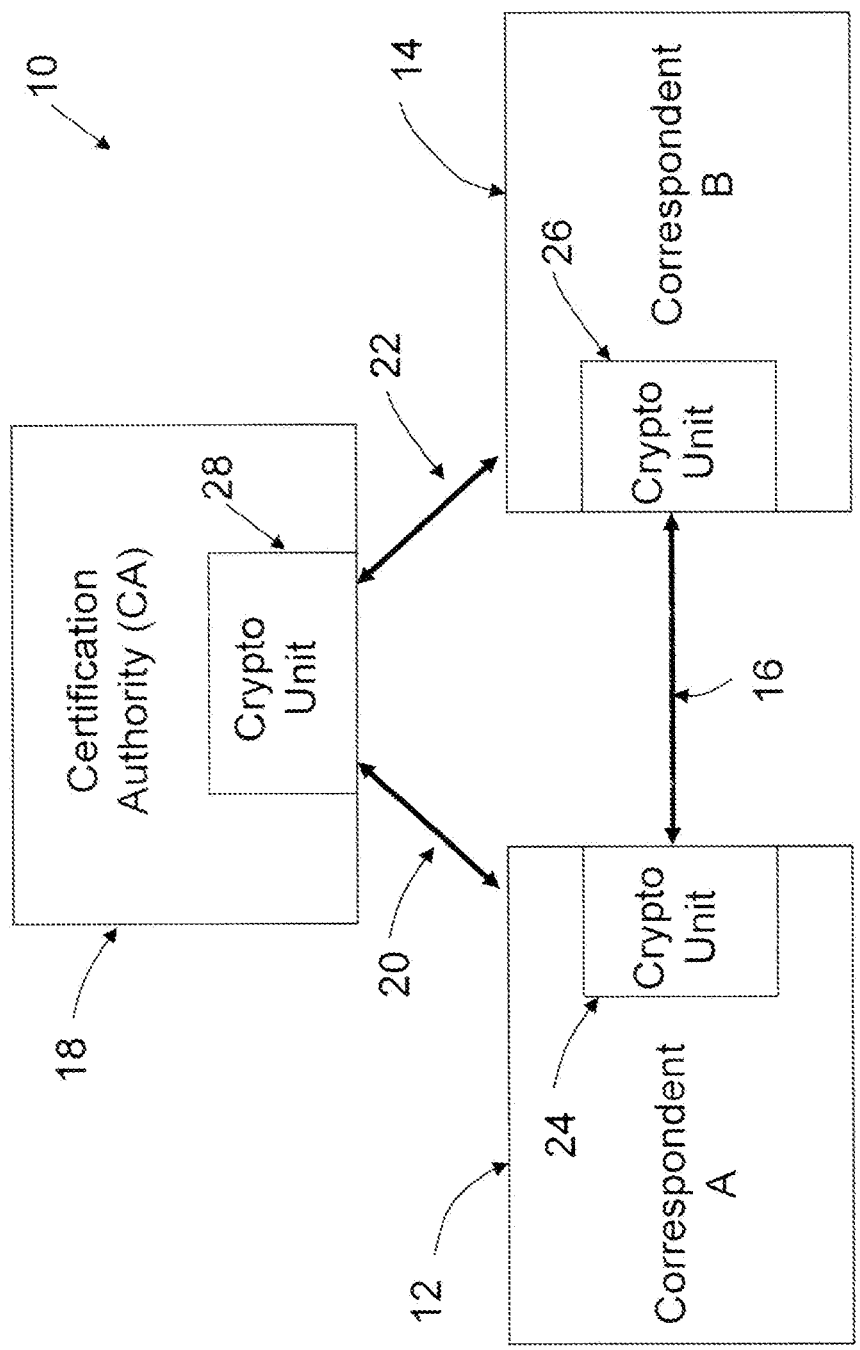
FIG. 1 is a schematic of a cryptographic communication system.

In general terms, the following provides methods for reducing the number of computations performed by a computing device constructing a public key from an implicit certificate. A self-signed implicit certificate scheme is also described, and the methods for reducing the number of computations are also applied to the self-signed implicit certificate scheme.

A system configured to perform the methods is also provided, as well as a computer-readable medium having stored thereon computer readable instructions for performing the methods.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, component, or device exemplified herein that executes instructions may include or otherwise have access to computer readable media such as storage media, computer storage media, or data storage devices (removable and/or non-removable) such as, for example magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Turning therefore to FIG. 1, a data communication system is generally denoted by numeral 10. The system 10 includes a first correspondent 12 and a second correspondent 14, which are typically a pair of computing devices, such as a client/server, a pair of computers, or a pair of mobile devices, who communicate with each other over a communication channel 16. The system also includes a CA 18, which communicates with the first correspondent 12 and the second correspondent 14 over communication channels 20 and 22 respectively. The CA 18 is a trusted party, typically also a computing device, that issues implicit certificates for the public keys of correspondent 12 or correspondent 14, or both.

Figure 2:
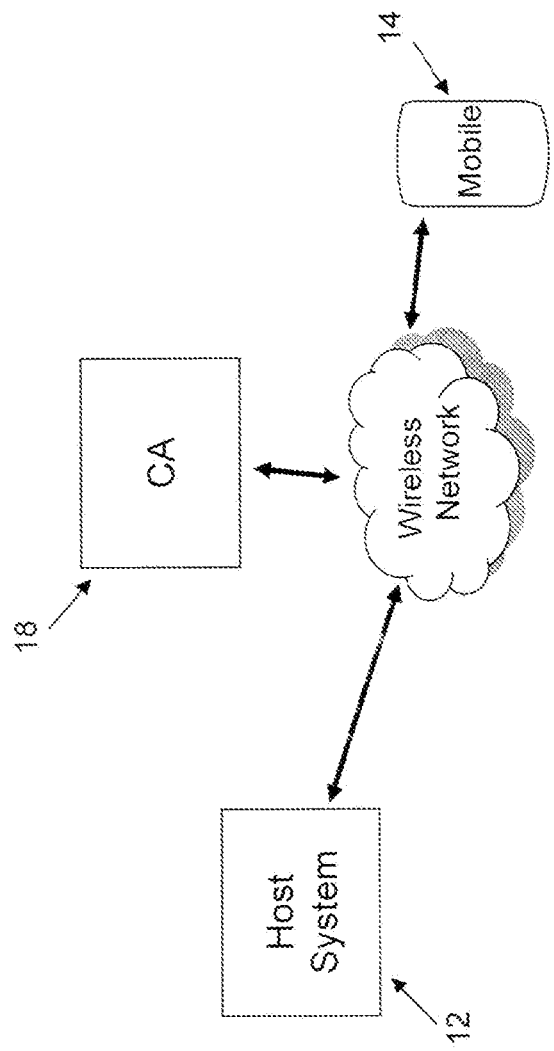
FIG. 2 is a schematic of one specific example of the communication System of FIG. 1.

FIG. 2 shows one specific implementation of the data communication system 10 of FIG. 1 in which the correspondent 14 is a mobile device, the correspondent 12 is a corporate enterprise computer system (host system) and the communication channel 16 is part of a wireless network. In the embodiment shown in FIG. 2, the host system 12 provides a host service that offers push-based messages for the mobile device 14. When data arrives at the host system 12, the host service is capable of notifying and presenting the data to the user in real-time at the mobile device 14. A wireless router (not shown) provides the wireless connectivity functionality as it acts to both abstract most of the wireless network's complexities, and it also implements features necessary to support pushing data to the mobile device 14. The host system 12 and mobile device 14 exchange public keys using certificates issued by the CA 18.

The embodiment shown in FIG. 2 is one specific implementation. More generally, and returning to FIG. 1, correspondent 12, correspondent 14, and CA 18 are computing devices that each have a cryptographic unit 24, 26, and 28 respectively to implement cryptographic protocols and associated arithmetic operations. In the illustrated embodiments, the cryptographic protocols are implemented in a public key cryptographic system based on the intractability of the discrete logarithm problem in an elliptic curve group defined over a finite field, commonly referred to as an elliptic curve cryptosystem or ECC. As such, a private key k is used to generate a corresponding public key Q by performing a k-fold group operation on a generator G of order n. The elliptic curve group is usually defined with an additive operation so that $Q=kG$.

Figure 3:
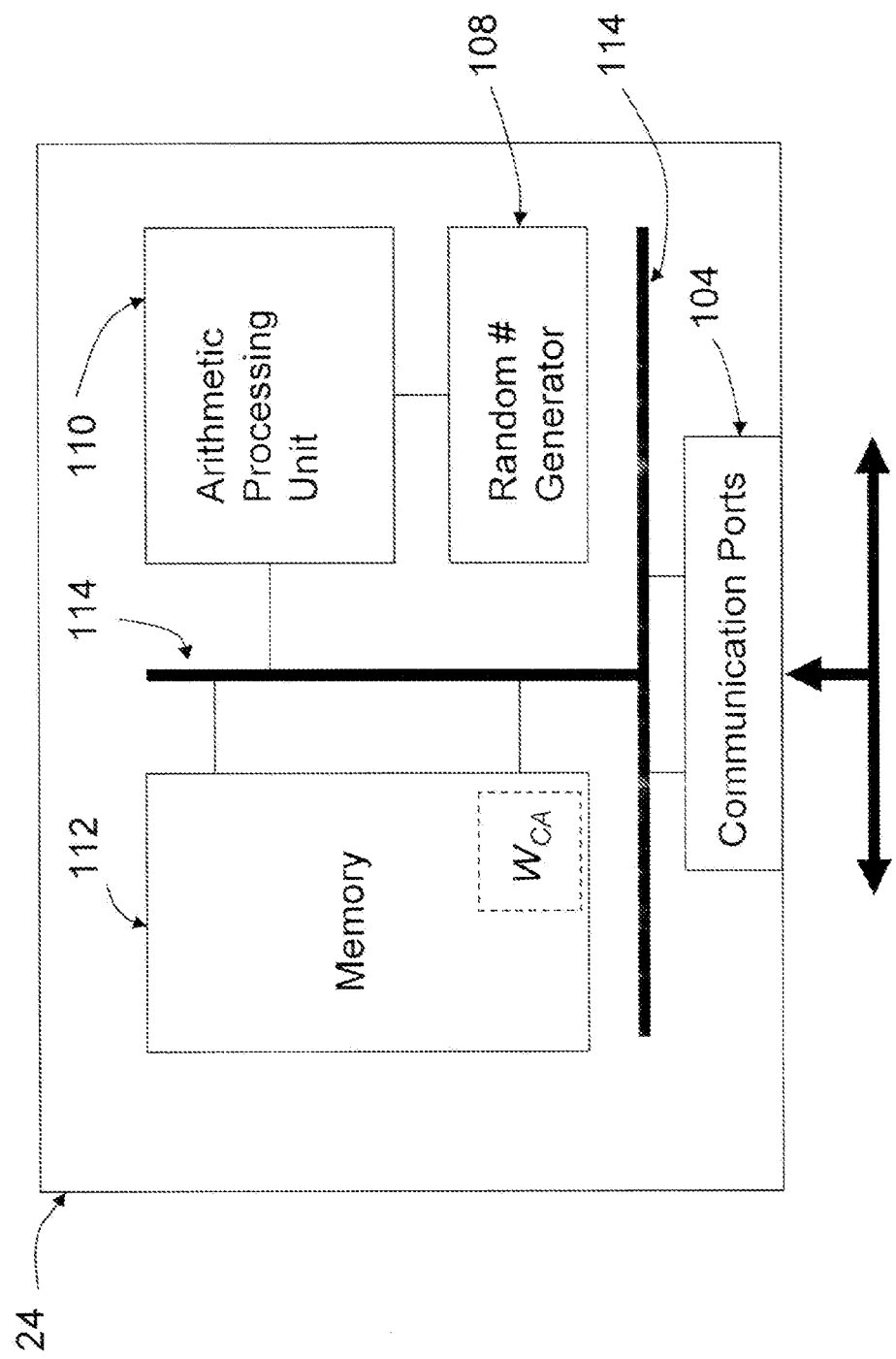
FIG. 3 is a schematic representation of a cryptographic unit of a computing device shown in FIG. 1.

The cryptographic unit 24 of the correspondent 12 is shown in greater detail in FIG. 3, it being understood that cryptographic units 26 and 28 will have similar functionality.

Cryptographic unit 24 comprises one or more communication ports 104 for communicating with correspondent 14 and CA 18, as well as an arithmetic processing unit 110 for performing elliptic curve cryptographic operations. The arithmetic processing unit 110 can comprise hardware, computer readable software instructions, or a combination of both that is configured to perform cryptographic operations such as those described in detail below. A random number generator 108 is accessible by the arithmetic processing unit 110. The cryptographic unit 24 further comprises memory 112 for storing the results of cryptographic operations and for storing information received via port 104. The static public key $W_{CA}$ of the CA 18 is stored in the memory 112 of correspondent 12. It will be appreciated that the static public key $W_{CA}$ of the CA 18 is also stored in the memory of the correspondent 14, and that the corresponding static private key $w_{CA}$ of the CA 18 is stored in a secure partition of the memory of the CA 18. Internal buses 114 are provided within cryptographic unit 24 for communicating information internally.

Figure 4:
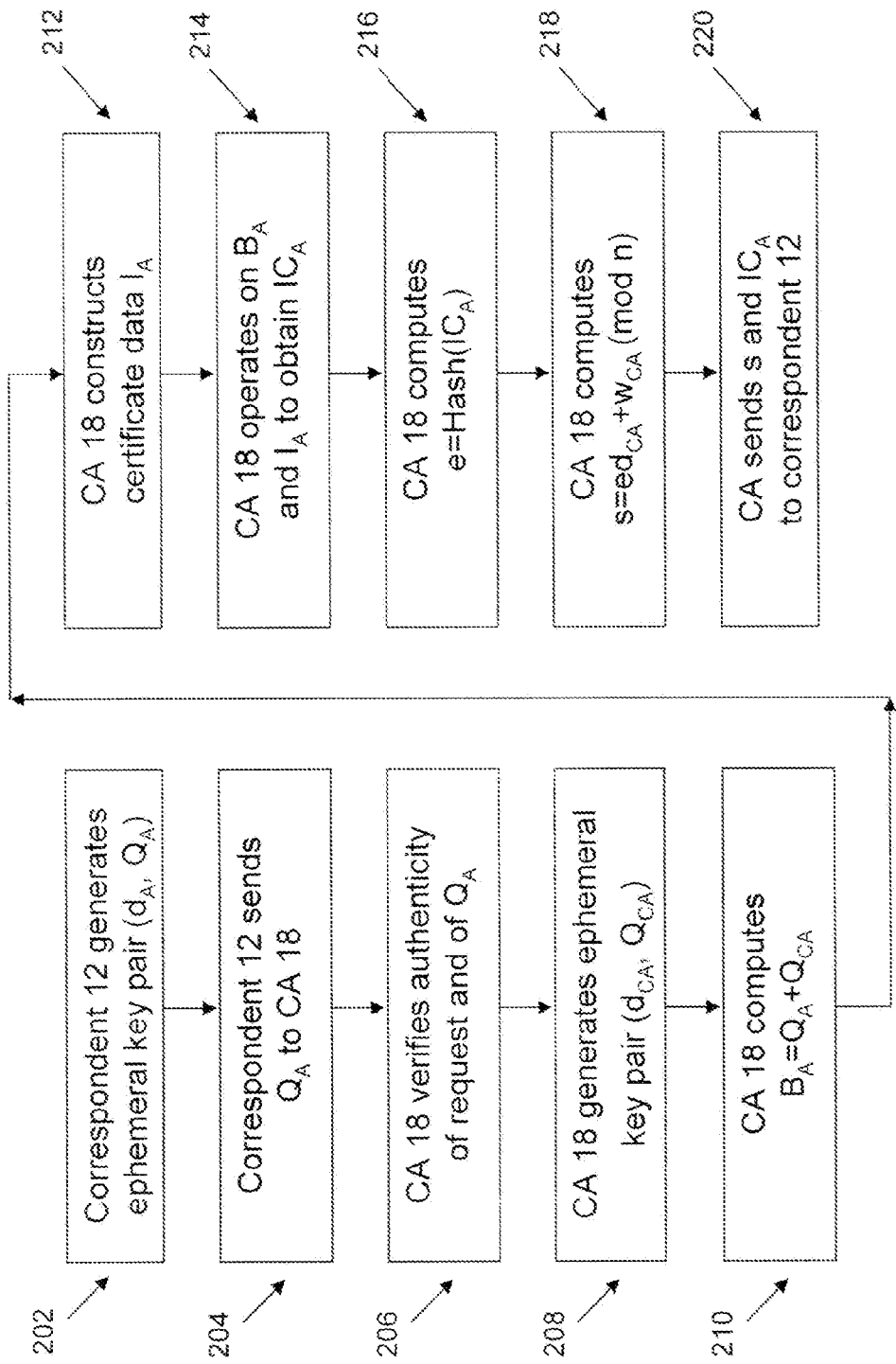
FIG. 4 is a schematic of an embodiment of a method of generating both an implicit certificate and private key reconstruction data.
Figure 5:
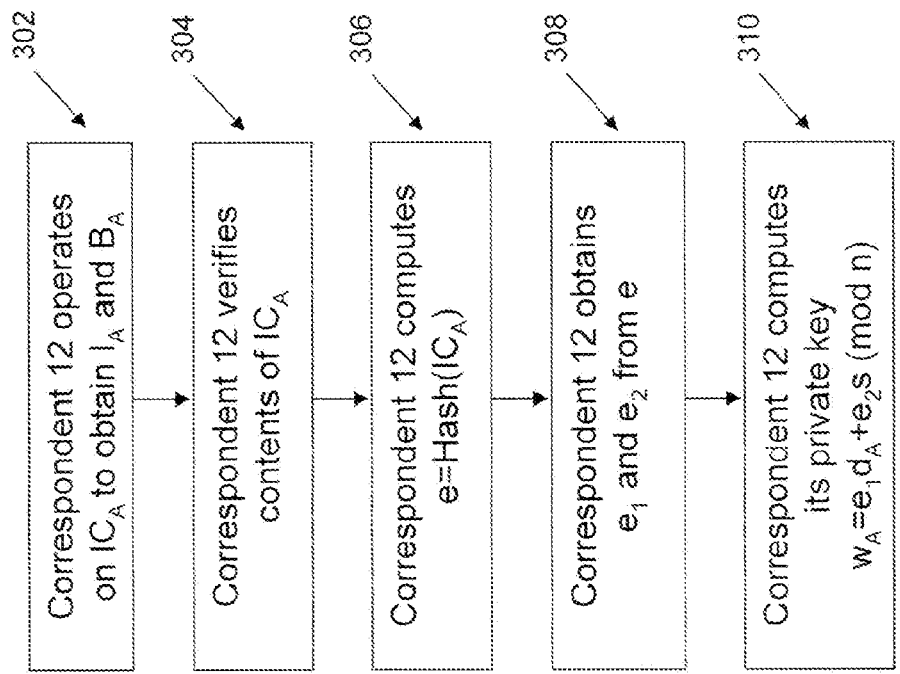
FIG. 5 is a schematic of an embodiment of a method of generating a private key using the implicit certificate and the private key reconstruction data.

During operation, correspondent 12 wishes to establish a key pair $(w_A, W_A)$ and distribute its public key $W_A$ to correspondent 14 using an implicit certificate. The correspondents 12 and 14, as well as the CA 18 therefore participate in an ECQV implicit certificate scheme that is modified as described below to reduce the number of computations required to construct the public key $W_A$ from the implicit certificate. The steps performed by correspondent 12 and the CA 18 are described with reference to FIGS. 4 and 5. FIGS. 4 and 5 can comprise a set of computer readable instructions executed by the correspondent 12 and the CA 18.

Turning first to FIG. 4, in step 202, the cryptographic unit 24 of correspondent 12 first generates an ephemeral private/public key pair ($d_A$, $Q_A$). $d_A$ is an integer, typically generated using the random number generator 108 within cryptographic unit 24, and $Q_A$ is calculated by unit 24 as $Q_A=d_A G$. The ephemeral value $d_A$ is temporarily stored, for example, in memory 112, for later use in constructing private key $w_A$.

In step 204, the correspondent 12 then transmits to the CA 18 over channel 20 its ephemeral public key $Q_A$, as well as a certificate request, which typically includes information such as the identity of the correspondent 12.

Next, in step 206, the CA 18 verifies the authenticity of the request received from the correspondent 12, for example, by checking that correspondent 12 is indeed the origin of the request and that correspondent 12 is authorized to obtain a certificate. The CA 18 also verifies that $Q_A$ is a valid key for the underlying parameters.

Then, in step 208, the cryptographic unit 28 of the CA 18 generates an ephemeral private/public key pair ($d_{CA}$, $Q_{CA}$).

Next, in step 210, the cryptographic unit 28 of the CA computes public key contribution data $B_A=Q_A+Q_{CA}$.

In step 212, the CA 18 then constructs certificate data $I_A$. The certificate data $I_A$ includes information specific to the certificate. For example, the certificate information can include information such as: identification information, the validity period of the certificate, and/or the intended use of the public key.

Next, in step 214, the CA 18 operates on $B_A$ and $I_A$ to construct an implicit certificate $IC_A$. This may be as simple as concatenating data values $B_A$ and $I_A$, e.g., $IC_A=B_A\|I_A$. It will be appreciated that a compressed or encoded version of $B_A$ can be used in place of $B_A$, as long as $B_A$ can be derived by a recipient of the implicit certificate from the compressed or encoded version of $B_A$. For example, the certificate may include an encoded or compressed octet string derived from $B_A$, for example, perhaps the x-coordinate of $B_A$ along with a single bit representing the y-coordinate of $B_A$.

In step 216, the cryptographic unit 28 of the CA 18 then calculates intermediate integer value e=Hash($IC_A$), where Hash( ) is a hash function. In an exemplary embodiment, Hash($IC_A$) is truncated, if necessary, in order to yield a value e having a maximum bit length of $\lfloor \log_2 n \rfloor$ bits.

Next, in step 218, cryptographic unit 28 uses integers $d_{CA}$ and e to compute private key reconstruction data s according to the formula $s=ed_{CA}+w_{CA}$ (mod n).

Finally, in step 220, the CA 18 sends to correspondent 12 over communication channel 20 the private key reconstruction data s (or an octet string representing s), as well as the implicit certificate $IC_A$.

Turning next to FIG. 5, the steps performed by the correspondent 12 to compute its private key $w_A$ using s and $IC_A$ are described below.

First, in step 302, correspondent 12 operates on $IC_A$ to obtain values $B_A$ and $I_A$. For example, if the implicit certificate is of the form $IC_A=B_A\|I_A$, correspondent 12 simply parses out the values $B_A$ and $I_A$. If the implicit certificate includes a compressed or encoded version of $B_A$, correspondent 12 operates on this compressed or encoded version of $B_A$ to obtain $B_A$.

In step 304, correspondent 12 then verifies the contents of $IC_A$ according to application rules. This can include verifying the contents of the certificate data $I_A$, and/or the certificate's validity period. In some embodiments, correspondent 12 also verifies $B_A$ is a valid key, for example, by verifying that $B_A$ is a point on the underlying curve. Correspondent 12 may also verify the origin of the certificate $IC_A$ and the private key reconstruction data s. The operation aborts if verification fails. If verification succeeds, then the operation continues.

Next, in step 306, the cryptographic unit 24 of the correspondent 12 calculates intermediate integer value e=Hash($IC_A$). In an exemplary embodiment, Hash($IC_A$) is truncated, if necessary, in order to yield a value e having a maximum bit length of $\lfloor \log_2 n \rfloor$ bits. The correspondent 12 verifies that e≠0.

Then, in step 308, the cryptographic unit 24 operates on integer e to obtain a pair of integers $e_1$ and $e_2$, each of the integers $e_1$ and $e_2$ having a bit length less than the bit length of e, and the ratio of $e_1$ and $e_2$ corresponding to e: $e=e_1/e_2$ (mod n). In general, e will have a bit length of $\lfloor \log_2 n \rfloor$ bits, and therefore $e_1$ and $e_2$ will each have bit lengths less than $\lfloor \log_2 n \rfloor$. As will be explained below, by utilizing $e_1$ and $e_2$ in the computation of the private and public key pair ($w_A$, $W_A$), computational savings can be achieved in the construction of the public key $W_A$.

In an exemplary embodiment, $e_1$ and $e_2$ are calculated using an iterative algorithm that is interrupted when integers of desired bit length are obtained, for example, the truncated version of the Extended Euclidean Algorithm. The Extended Euclidean Algorithm is known in the art, and is described, for example, in Algorithm 2.19 in *Guide to Elliptic Curve Cryptography*, Hankerson et al., Springer-Verlag, 2004, incorporated herein by reference. The Extended Euclidean Algorithm is repeated below using the notation of Algorithm 2.19:

---

INPUT: Positive integers a and b with a ≤ b.
1. u ← a; v ← b; $x_1$ ← 1; $y_1$ ← 0; $x_2$ ← 0; $y_2$ ← 1;
2. While u ≠ 0 do:
    2.1 q ← $\lfloor v/u \rfloor$; r ← v − qu; x ← $x_2$ − $qx_1$; y ← $y_2$ − $qy_1$;
    2.2 v ← u; u ← r; $x_2$ ← $x_1$; $x_1$ ← x; $y_2$ ← $y_1$; $y_1$ ← y;
3. d ← v; x ← $x_2$; y ← $y_2$;
4. Return (d,x,y).

---

To perform the truncated Extended Euclidean Algorithm, the cryptographic unit 24 executes the Extended Euclidean Algorithm above with inputs a=e and b=n, but "truncates" or stops the Extended Euclidean Algorithm as soon as $x_1$ is an integer that is more than t bits long, where $t=\lambda \lfloor \log_2 n \rfloor$. $\lambda$ is an efficiency parameter selected by the cryptographic unit 24. $\lambda$ is selected to be between 0 and 1. It is preferred that $\lambda=0.5$ to achieve maximum computational savings in the construction of public key $W_A$, however, it will be appreciated that in general $0<\lambda<1$. When $\lambda=0$, there are no computational savings over performing ECQV.

In general, any method, technique, or algorithm can be executed by the cryptographic unit 24 that produces $e_1$ and $e_2$ from e such that $e_1$ and $e_2$ have a bit length less than the bit length of e, and such that the ratio of $e_1$ and $e_2$ corresponds to e.

Once $e_1$ and $e_2$ are computed, in step 310, the cryptographic unit 24 of correspondent 12 retrieves ephemeral private key $d_A$ from memory 112 and computes its private key $w_A$ by combining the integer $e_1$ with the ephemeral private key $d_A$ and combining the integer $e_2$ with the private key contribution data s. The computation of the private key $w_A$ is of the form $w_A=e_1d_A+e_2s \pmod{n}$.

Correspondent 12 has now generated its private key $w_A$ using implicit certificate $IC_A$ and private key reconstruction data s transmitted from the CA 18. As will be shown in FIG. 6, the public key $W_A$ corresponding to private key $w_A$ is computable by any party having the implicit certificate $IC_A$.

Figure 6:
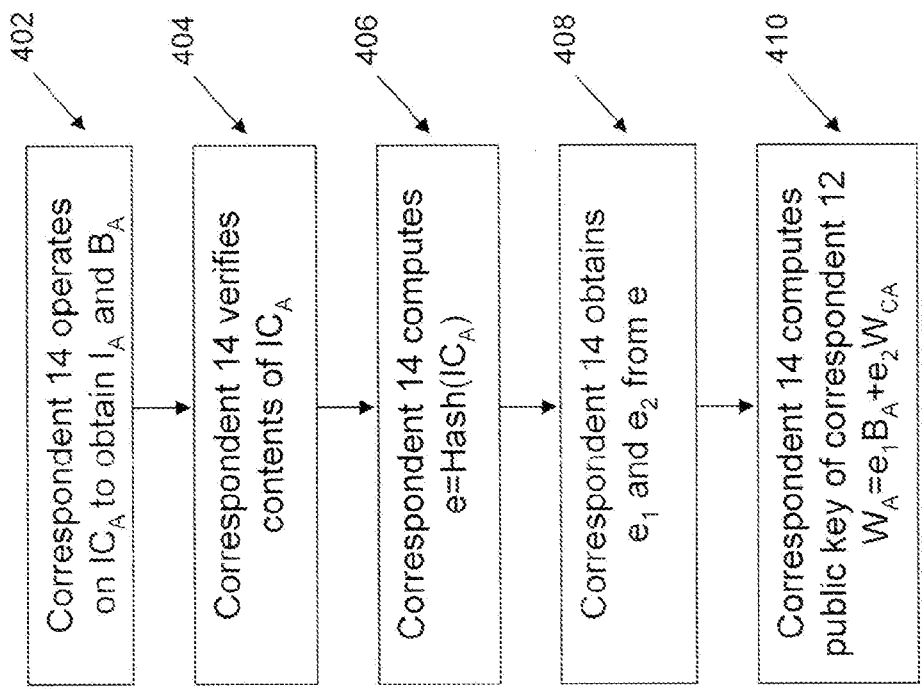
FIG. 6 is a schematic of an embodiment of a method of generating a public key by operating upon the implicit certificate.

Let us assume that correspondent 14 wishes to obtain the public key $W_A$ of correspondent 14. Therefore, correspondent 14 requests implicit certificate $IC_A$ from the CA 18 over communication channel 22. Upon receiving implicit certificate $IC_A$, correspondent, 14 performs the following steps described below with reference to FIG. 6 to obtain the public key $W_A$ of correspondent 12. FIG. 6 can comprise a set of computer readable instructions executed by the correspondent 14.

First, in step 402, correspondent 14 operates on $IC_A$ to obtain values $B_A$ and $I_A$. For example, if the implicit certificate is of the form $IC_A=B_A\|I_A$, correspondent 14 simply parses out the values $B_A$ and $I_A$. If the implicit certificate includes a compressed or encoded version of $B_A$, correspondent 14 operates on this compressed or encoded version of $B_A$ to obtain $B_A$.

In step 404, correspondent 14 then verifies the contents of $IC_A$ according to application rules. This can include verifying the contents of the certificate data $I_A$, and/or the certificate's validity period. In some embodiments, correspondent 14 also verifies $B_A$ is a valid key, for example, by verifying that $B_A$ is a point on the underlying curve.

Next, in step 406, the cryptographic unit 26 of the correspondent 14 calculates intermediate integer value e=Hash$(IC_A)$. In an exemplary embodiment, Hash$(IC_A)$ is truncated, if necessary, in order to yield a value e having a maximum bit length of $\lfloor \log_2 n \rfloor$ bits. The correspondent 14 verifies that e≠0.

Then, in step 408, the cryptographic unit 26 operates on integer e to derive the pair of integers $e_1$ and $e_2$, as in step 308 of FIG. 5.

Finally, in step 410, the cryptographic unit 26 of correspondent 14 retrieves the static public key $W_{CA}$ of the CA 18 and computes the public key $W_A$ of correspondent 12 by combining the integer $e_1$ with the public key contribution data $B_A$ and combining the integer $e_2$ with the public key $W_{CA}$ of the CA. The combination is of the form $W_A=e_1B_A+e_2W_{CA}$.

Thus, by performing steps 402 to 410, correspondent 14 obtains the public key $W_A$ of correspondent 12 by operating on the implicit certificate $IC_A$.

Upon the completion of step 410, correspondent 14 may then use $W_A$ to perform a operation with correspondent 12 involving both. $W_A$ and $w_A$ to implicitly authenticate $W_A$. For example, correspondent 12 and correspondent 14 may subsequently engage in an ECMQV key agreement or ECDSA signature protocol, both of which require the use of $W_A$ and $w_A$. If the key agreement or signature operations fail, then $W_A$ might not have been authentic or valid. On the other hand, if the key agreement or signature operations are successful, then correspondent 12 must possess $w_A$, and the authenticity and validity of $W_A$ is implicitly verified.

In the embodiments described above, the private key $w_A$ of correspondent 12 and the corresponding public key $W_A$ of correspondent 12 are computed using integers $e_1$ and $e_2$ as $w_A=e_1d_A+e_2s \pmod{n}$ and $W_A=e_1B_A+e_2W_{CA}$ respectively. As discussed above, integers $e_1$ and $e_2$ are derived such that each of the integers $e_1$ and $e_2$ has a bit length less than the bit length of e, and such that the ratio of $e_1$ and $e_2$ corresponds to e, i.e., $e=e_1/e_2 \pmod{n}$.

In conventional ECQV, the key pair $(w_A, W_A)$ is calculated as $w_A=ed_A+s \pmod{n}$ and $W_A=eB_A+W_{CA}$. However, by instead obtaining $e_1$ and $e_2$ from e and calculating the key pair $(w_A, W_A)$ using $e_1$ and $e_2$ as above, computational savings can be achieved. This is because $e_1$ and $e_2$ each have a bit length less than e, which can be exploited to substantially reduce the number of computations required to calculate public key $W_A$. Even though, the calculation of $W_A=e_1B_A+e_2W_{CA}$ requires two point multiplications ($e_1B_A$ and $e_2W_{CA}$) compared to one ($eB_A$), the fact that $e_1$ and $e_2$ each have a bit length less than e, combined with, other techniques known in the art, can result in substantial computational savings overall. For example, in one embodiment, $W_A=e_1B_A+e_2W_{CA}$ is computed by the cryptographic unit 26 of correspondent 14 using simultaneous multiple point multiplication, which saves on doubling operations. Algorithms for performing multiple point multiplication are known in the art. An example of one such algorithm is simultaneous multiple point multiplication, which is described, for example, in Algorithm 3.48 in *Guide to Elliptic Curve Coptography*, Hankerson et al., Springer-Verlag, 2004, incorporated herein by reference. The simultaneous multiple point multiplication algorithm is repeated below for completeness mirroring the notation used in Algorithm 3.48:

---

INPUT: Window width w, $e_1 = (k_{i-1},...,k_0)_2$, $e_2 = (l_{t-1},...,l_0)_2$, $B_A$, $W_{CA}$.
OUTPUT: $e_1B_A + e_2W_{CA}$
1. Compute $iB_A + jW_{CA}$ for all i, j ∈ $[0, 2^w-1]$.
2. Write $e_1 = (K^{d-1},..., K^1, K^0)$ and $e_2 = (L^{d-1},..., L^1, L^0)$ where each $K^i$, $L^i$ is a bit string of length w, and d = $\lceil t / w \rceil$.
3. R ← ∞.
4. For i from d − 1 down to 0 do:
    4.1 R ← $2^w$ R;
    4.2 R ← R + ($K^i B_A + L^i W_{CA}$);
5. Return R.

---

In another embodiment, correspondent 14 has stored in its memory pre-computed multiples of the static public key $W_{CA}$. Therefore, in calculating the public key $W_A$ of correspondent 12, correspondent 14 needs only to compute $e_1B_A$, since $e_2W_{CA}$ can be retrieved from the table of pre-computed multiples in memory using $e_2$. Since $e_1$ has a bit length less than e, the number of computations required to compute $e_1B_A$ is less than the number of computations, required to compute $eB_A$.

As from the above, to calculate the public key $W_A$ using $e_1$ and $e_2$ to achieve computational savings, one option is to calculate the corresponding private key $w_A$ using $e_1$ and $e_2$. Although there may not be computational savings in computing the private key as $w_A=e_1B_A+e_2s \pmod{n}$ compared to the computation $w_A=ed_A+s \pmod{n}$ in conventional ECQV, it will be appreciated that the computational savings in computing $W_A$ as $W_A=e_1B_A+e_2W_{CA}$ outweigh any additional computations necessary to compute $w_A=e_1d_A+e_2s \pmod{n}$. This is because the total number of integer multiplications and additions required to calculate private key $w_A$ is substantially less than the total number of computations required to compute the public key $W_A$. Savings in computing the public key $W_A$ outweigh any additional computations necessary to compute private key $w_A$ and/or to derive integers $e_1$ and $e_2$. Moreover, only one correspondent (correspondent 12) computes the private key $w_A$, whereas potentially many correspondents will compute the corresponding public key $W_A$ from the implicit certificate $IC_A$. Therefore, the above-described technique provides computational savings overall.

The above technique can also be applied to a scheme for generating self-signed implicit certificates. Self-signed certificates can be used in a data communication system to begin a chain of trust. Typically, a root CA issues a self-signed certificate as an output of a trusted event, and the self-signed certificate can subsequently be operated upon by any correspondent in the data communication system to obtain the public key of the root CA.

Figure 7:
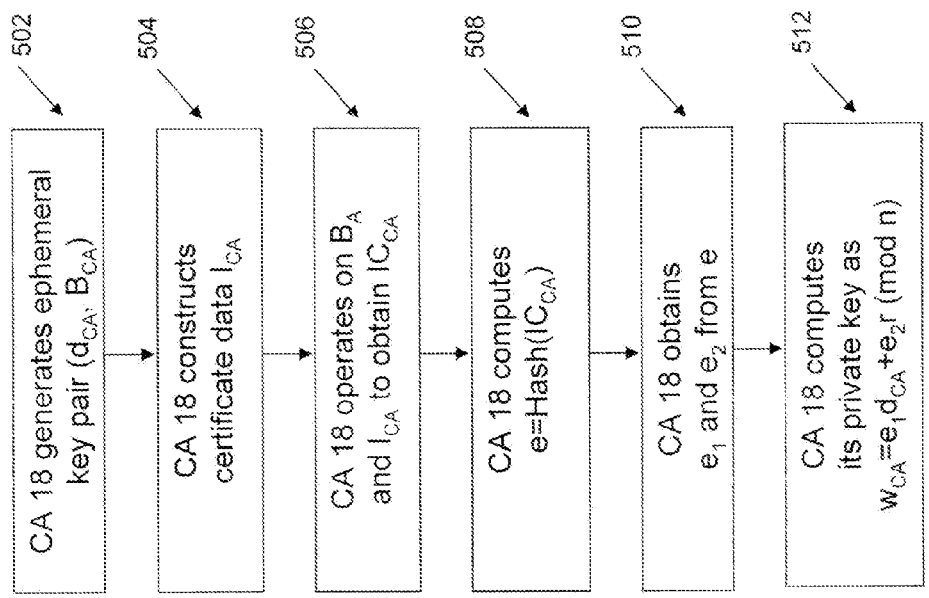
FIG. 7 is a schematic of an embodiment of a method of generating a self-signed implicit certificate.
Figure 8:
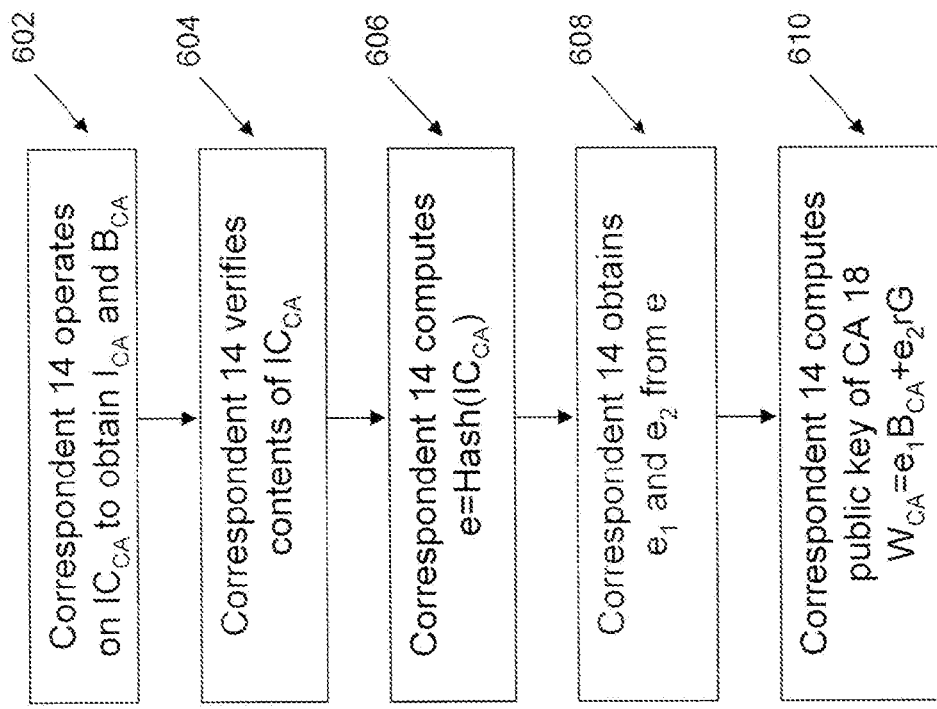
FIG. 8 is a schematic of an embodiment of a method of generating a public key by operating upon the self-signed implicit certificate.

The generation of a self-signed implicit certificate by the CA 18, as well as the process by which the self-signed implicit certificate is operated on to derive $W_{CA}$, is explained in full detail below with reference to FIGS. 7 and 8. FIGS. 7 and 8 can comprise a set of computer readable instructions executed by the CA 18 and by a correspondent.

Turning first to FIG. 7, the generation of a self-signed implicit certificate $IC_{CA}$ by the CA 18 is described. First, in step 502, the cryptographic unit 28 of the CA 18 first generates an ephemeral private/public key pair ($d_{CA}$, $B_{CA}$). $d_{CA}$ is an integer, typically generated using a random number generating module within cryptographic unit 28, and $B_{CA}$ is calculated by cryptographic unit 28 as $B_{CA}=d_{CA}G$.

In step 504, the CA 18 next creates certificate data $I_{CA}$ for its self-signed certificate. The certificate data $I_{CA}$ includes information specific to the certificate. For example, the certificate information can include information such as: identification information, the validity period of the certificate, and/or the intended use of the public key.

Next, in step 506, the CA 18 operates upon $B_{CA}$ and $I_{CA}$ to generate a self-signed implicit certificate $IC_{CA}$. This can be as simple as concatenating values $B_{CA}$ and $I_{CA}$, e.g., $IC_{CA}=B_{CA}\|I_{CA}$. It will be appreciated that a compressed or encoded version of $B_{CA}$ can be used in place of $B_{CA}$, as long as $B_{CA}$ can be derived by a recipient of the self-signed implicit certificate from the compressed or encoded version of $B_{CA}$. For example, the certificate may include a compressed or encoded octet string derived from $B_{CA}$, for example, perhaps the x-coordinate of $B_{CA}$ along with a single bit representing the y-coordinate of $B_{CA}$.

In step 508, the cryptographic unit 28 of the CA 18 then calculates intermediate integer value $e=\text{Hash}(IC_{CA})$, where Hash( ) is a hash function. In an exemplary embodiment, $\text{Hash}(IC_{CA})$ is truncated, if necessary, in order to yield a value e, having a maximum bit, length of $\lfloor \log_2 n \rfloor$ bits.

Then, in step 510, the cryptographic unit 28 operates on integer e to obtain the pair of integers $e_1$ and $e_2$, as in step 308 of FIG. 5. That is, the cryptographic unit 28 operates on integer e to obtain a pair of integers $e_1$ and $e_2$, each of the integers $e_1$ and $e_2$ having a bit 1.2 length less than the bit length of e, and the ratio of $e_1$ and $e_2$ corresponding to e: $e=e_1/e_2 \pmod n$. In an exemplary embodiment, $e_1$ and $e_2$ are derived using the truncated Extended Euclidean Algorithm, as described earlier.

Finally, in step 512, the cryptographic unit 28 operates upon integers $d_{CA}$ and $e_1$ to compute its private key $w_{CA}$ according to the formula $w_{CA}=e_1 d_{CA}+e_2 r \pmod n$, where r is an integer parameter, possibly private to the CA 18. For example, r can be 0, 1, or $d_{CA}$. In an exemplary embodiment, r=0, and therefore $w_{CA}=e_1 d_{CA} \pmod n$.

As will be shown in FIG. 8, the public key $W_{CA}$ corresponding to private key $w_{CA}$ is computable by any party having the self-signed implicit certificate $IC_{CA}$.

The CA 18 then sends its self-signed implicit certificate $IC_{CA}$ to correspondents 12 and 14. Upon receiving self-signed implicit certificate $IC_{CA}$, a given correspondent say correspondent 14, performs the following steps described below with reference to FIG. 8 to obtain $W_{CA}$.

First, in step 602, correspondent 14 operates upon $IC_{CA}$ to obtain values $B_{CA}$ and $I_{CA}$. For example, if the self-signed implicit certificate is of the form $IC_{CA}=B_{CA}\|I_{CA}$, the correspondent 14 simply parses $IC_{CA}$ to obtain the values $B_{CA}$ and $I_{CA}$. If the self-signed implicit certificate includes a compressed or encoded version of $B_{CA}$, the correspondent 14 operates on this compressed or encoded version of $B_{CA}$ to obtain $B_{CA}$.

In step 604, correspondent 14 then verifies the contents of $IC_{CA}$ according to application rules. This can include verifying the contents of the certificate data $I_{CA}$ and/or the certificate's validity period. In some embodiments, correspondent 14 also verifies $B_{CA}$ is a valid key, for example, by verifying that $B_{CA}$ is a point on the underlying curve.

Next, in step 606, the cryptographic unit 26 of the correspondent 14 calculates intermediate integer value $e=\text{Hash}(IC_A)$. In an exemplary embodiment, $\text{Hash}(IC_A)$ is truncated, if necessary, in order to yield a value e having a maximum bit length of $\lfloor \log_2 n \rfloor$ bits. The correspondent 14 verifies that $e \neq 0$.

Then, in step 608, the cryptographic unit 26 operates on integer e to obtain the pair of integers $e_1$ and $e_2$, as in step 510 of FIG. 7.

Finally, in step 610, the cryptographic unit 26 of correspondent 14 computes the public key $W_{CA}$ of the CA 18 as $W_{CA}=e_1 B_{CA}+e_2 rG$, where rG is public or publicly computable by correspondent 14. As described above, in an exemplary embodiment r=0, and therefore $W_{CA}=e_1 B_{CA}$.

Thus, by performing steps 602 to 610, correspondent 14 obtains the public key $W_{CA}$ of the CA 18 by operating on the self-signed implicit certificate $IC_{CA}$. As is clear from FIG. 8, correspondent 14 can operate on $IC_{CA}$ itself without using another public key to compute $W_{CA}$. Upon the completion of step 610, correspondent 14 may then use $W_{CA}$ obtained via FIG. 8 to verify and/or operate upon a certificate issued by the CA 18.

In the self-signed implicit scheme described with reference to FIGS. 7 and 8, the use of integers $e_1$ and $e_2$ offers computational savings over directly using integer e to calculate key pair ($w_{CA}$, $W_{CA}$). This is because $e_1$ and $e_2$ each have a bit length less than the bit length of e, which can be exploited to reduce the overall number of computations. In an exemplary embodiment, when r=0, only a multiplication involving $e_1$ is required. Since $e_1$ has a bit length less than e, therefore the computation involving $e_1$ offers computational savings.

Advantageously, the schemes described with reference to FIGS. 4 to 8 involve transformations of a nature similar to the transformations applied in conventional ECQV. This is particularly convenient when implementing the above in existing ECQV-based schemes.

Although the above techniques have been described with reference to certain specific embodiments, various modifications thereof will be apparent to those skilled in the art without departing from the spirit and scope of the claims appended hereto.

For example, it will be appreciated that the self-signed implicit certificate scheme described in FIGS. 7 and 8 can be implemented in any trust model or topology. Generally, in any trust model or topology in which a particular CA needs to issue a root public key or a public key having an equivalent purpose, the above-described self-signed implicit certificate scheme may be used.

It will also be appreciated that the techniques described above are not limited to elliptic curve systems, but may be extended to non-elliptic curve discrete logarithmic systems (e.g. systems based on an underlying multiplicative group) using straight-forward modifications apparent to a person skilled in the art having the benefit of the present disclosure.

Figure 9:
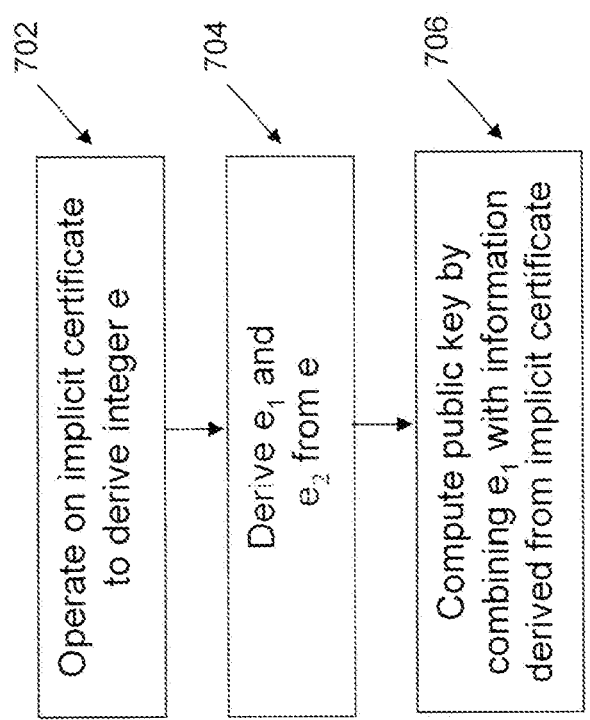
FIG. 9 is a schematic of an embodiment of a method of computing a public key from an implicit certificate.

Therefore, in view of the above embodiments, FIG. 9 discloses generally a method of computing a public key from an implicit certificate in a cryptographic communication system based on an underlying group. The method is performed by a computing device in the communication system and includes the following steps. In step 702, the device first operates on the implicit certificate in its cryptographic unit to derive an integer e. In step 704, the device then uses its cryptographic unit to derive a pair of integers ($e_1$, $e_2$) from the integer e, such that each of the pair of integers ($e_1$, $e_2$) has a bit length less than the bit length of the integer e, and such that the ratio of the pair of integers ($e_1$, $e_2$) corresponds to the integer e. Finally, in step 706, the device computes the public key by combining the integer $e_1$ of the pair of integers ($e_1$, $e_2$) with information derived from the implicit certificate.

Figure 10:
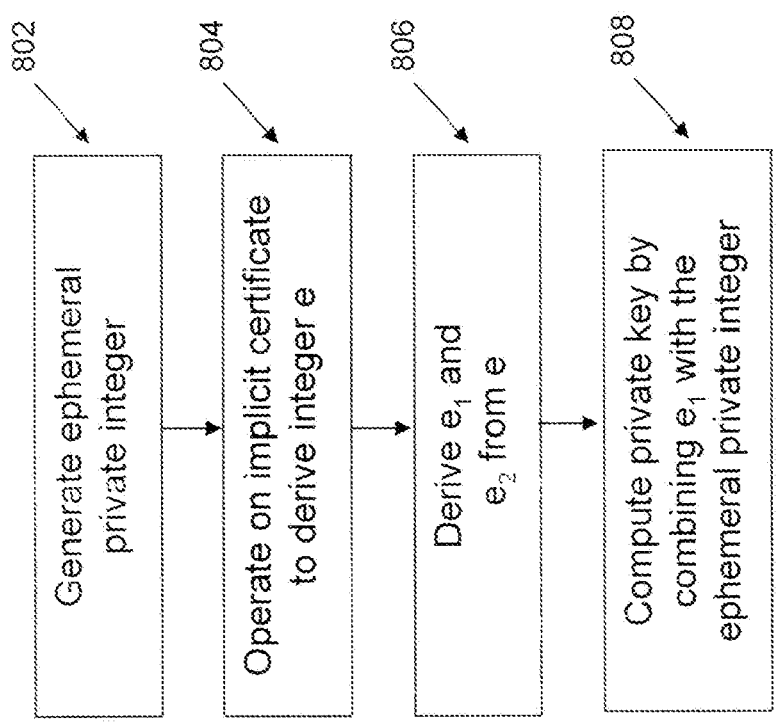
FIG. 10 is a schematic of an embodiment of a method of computing a private key.

FIG. 10 discloses generally a method of computing a private key in a cryptographic communication system based on an underlying group of order n. The method is performed by a computing device in the communication system and includes the following steps. In step 802, the device first generates an ephemeral private integer. Then, in step 804, the device operates on an implicit certificate in its cryptographic unit to derive an integer e. Next, in step 806, the device uses its cryptographic unit to derive a pair of integers ($e_1$, $e_2$) from the integer e, such that each of the pair of integers ($e_1$, $e_2$) has a bit length less than the bit length of the integer e, and such that the ratio of the pair of integers ($e_1$, $e_2$) corresponds to the integer. Finally, in step 808, the device computes the private key by combining the integer $e_1$ of the pair of integers ($e_1$, $e_2$) with the ephemeral private integer.

What is claimed is:

1. A method of computing a public key from an implicit certificate associated with a certificate authority in a cryptographic communication system based on an underlying group of order n; the method being performed by a computing device in the communication system; the device comprising a cryptographic unit; the method comprising:
   the device operating on the implicit certificate in the cryptographic unit to derive an integer e;
   the device deriving a pair of integers $e_1$ and $e_2$ from the integer e in said cryptographic unit, each of the integers $e_1$ and $e_2$ having a bit length less than the bit length of the integer e, and the ratio of the pair of integers $e_1$ and $e_2$ corresponding to the integer e; and
   the device computing the public key by combining the integers $e_1$ and $e_2$ with public key contribution data derived from said implicit certificate and a static public key of the certificate authority,
   wherein the pair of integers $e_1$ and $e_2$ are derived using a truncated Extended Euclidean Algorithm.

2. The method of claim 1 wherein said operating on the implicit certificate in the cryptographic unit to derive said integer e comprises: computing a hash H of the implicit certificate and operating on said hash H to derive said integer e.

3. The method of claim 2 wherein said group is an elliptic curve group, the method further comprising:
   the device verifying contents of the implicit certificate; and
   upon verification, the device operating on the implicit certificate to derive a point on an elliptic curve representing the public key contribution data;
   and wherein the computing of the public key comprises combining the integer $e_1$ with the public key contribution data and combining the integer $e_2$ with the static public key of the certificate authority.

4. The method of claim 3 wherein the public key is of the form $e_1 B_A + e_2 W_{CA}$; wherein $B_A$ is the public key contribution data and $W_{CA}$ is the static public key of the certificate authority that issued the implicit certificate.

5. The method of claim 4 wherein the public key is computed using simultaneous multiple point multiplication.

6. The method of claim 3 wherein the implicit certificate is a self-signed implicit certificate, and wherein the public key is of the form $e_1 B_{CA}$, wherein $B_{CA}$ is an ephemeral public key of the certificate authority.

7. A method of computing a private key from an implicit certificate associated with a certificate authority in a cryptographic communication system based on an underlying group of order n; the method being performed by a computing device in the communication system; the device comprising a cryptographic unit; the method comprising:
   the device generating an ephemeral private key;
   the device operating on the implicit certificate in the cryptographic unit to derive an integer e;
   the device deriving a pair of integers $e_1$ and $e_2$ from the integer e in the cryptographic unit, each of the integers $e_1$ and $e_2$ having a bit length less than the bit length of the integer e, and the ratio of the integers $e_1$ and $e_2$ corresponding to the integer e; and
   the device computing the private key by combining the integers $e_1$ and $e_2$ with the ephemeral private key and private key contribution data of the certificate authority,
   wherein the integers $e_1$ and $e_2$ are derived using a truncated Extended Euclidean Algorithm.

8. The method of claim 7 wherein the operating on the implicit certificate in the cryptographic unit to derive the integer e comprises: computing a hash H of the implicit certificate and operating on the hash H to derive the integer e.

9. The method of claim 8 wherein the group is an elliptic curve group, the method further comprising:
   the device verifying contents of the implicit certificate; and
   upon verification, the device combining the integer $e_1$ with the ephemeral private key and combining the integer $e_2$ with the private key contribution data.

10. The method of claim 9 wherein the private key is of the form $e_1 d_A + e_2 s \pmod{n}$; wherein $d_A$ is the ephemeral private key and s is private key contribution data received from the certificate authority.

11. The method of claim 8 wherein the group is an elliptic curve group, the implicit certificate is a self-signed implicit certificate, and the computing device is the certificate authority.

12. The method of claim 11 wherein the private key is of the form $e_1 d_{CA} \pmod{n}$, wherein $d_{CA}$ is the ephemeral private key of the certificate authority.

13. A device comprising a processor and memory, the device configured to compute a public key from an implicit certificate associated with a certificate authority in a cryptographic communication system based on an underlying group of order n, and the device configured to perform operations comprising:
   operating on the implicit certificate in the cryptographic unit to derive an integer e;
   deriving a pair of integers $e_1$ and $e_2$ from the integer e in said cryptographic unit, each of the integers $e_1$ and $e_2$ having a bit length less than the bit length of the integer e, and a ratio of the pair of integers $e_1$ and $e_2$ corresponding to the integer e; and
   computing the public key by combining the integers $e_1$ and $e_2$ with public key contribution data derived from said implicit certificate and a static public key of the certificate authority,
   wherein the pair of integers $e_1$ and $e_2$ are derived using a truncated Extended Euclidean Algorithm.

14. A device comprising a processor and memory, the device configured to compute a private key from an implicit certificate associated with a certificated authority in a cryptographic communication system based on an underlying group of order n, and the device configured to perform operations comprising:

generating an ephemeral private key;

operating on the implicit certificate in the cryptographic unit to derive an integer e;

deriving a pair of integers $e_1$ and $e_2$ from the integer e in the cryptographic unit, each of the integers $e_1$ and $e_2$ having a bit length less than the bit length of the integer e, and a ratio of the integers $e_1$ and $e_2$ corresponding to the integer e; and computing the private key by combining the integers $e_1$ and $e_2$ with the ephemeral private key and private key contribution data of the certificate authority, wherein the integers $e_1$ and $e_2$ are derived using a truncated Extended Euclidean Algorithm.

15. A certificate authority comprising a processor and memory, the certificate authority configured to compute a private key from an implicit certificate associated with the certificate authority in a cryptographic communication system based on an underlying group of order n, and the certificate authority configured to perform operations comprising:

generating an ephemeral private key;

operating on the implicit certificate in the cryptographic unit to derive an integer e;

deriving a pair of integers $e_1$ and $e_2$ from the integer e in the cryptographic unit, each of the integers $e_1$ and $e_2$ having a bit length less than the bit length if the integer e, and a ratio of the integers $e_1$ and $e_2$ corresponding to the integer e; and computing the private key by combining the integers $e_1$ and $e_2$ with the ephemeral private key and private key contribution data of the certificate authority, wherein the integers $e_1$ and $e_2$ are derived using a truncated Extended Euclidean Algorithm.

16. A non-transitory computer readable medium having stored thereon computer readable instructions for performing the method of claim 1.

17. A non-transitory computer readable medium having stored thereon computer readable instructions for performing the method of claim 7.

\* \* \* \* \*